United States Patent
Garcia et al.

(10) Patent No.: US 12,072,205 B2
(45) Date of Patent: Aug. 27, 2024

(54) INTERACTION SYSTEM FOR COCKPIT OF AN AIRCRAFT

(71) Applicant: THALES, Courbevoie (FR)

(72) Inventors: Jean-Sébastien Garcia, Mérignac (FR); Veran Helsen, Mérignac (FR); Philippe Chabot, Mérignac (FR); François Leullier, Mérignac (FR)

(73) Assignee: THALES, Courbevoie (FR)

( * ) Notice: Subject to any disclaimer, the term of this patent is extended or adjusted under 35 U.S.C. 154(b) by 143 days.

(21) Appl. No.: 16/838,630

(22) Filed: Apr. 2, 2020

(65) Prior Publication Data

US 2020/0326205 A1 Oct. 15, 2020

(30) Foreign Application Priority Data

Apr. 9, 2019 (FR) ...................................... 19 03771

(51) Int. Cl.
*G08G 5/00* (2006.01)
*G01C 23/00* (2006.01)
*G06F 3/04845* (2022.01)
*G06F 3/0487* (2013.01)
*G06F 3/0488* (2022.01)
(Continued)

(52) U.S. Cl.
CPC ....... *G01C 23/005* (2013.01); *G06F 3/04845* (2013.01); *G06F 3/0487* (2013.01); *G06F 3/0488* (2013.01); *G06F 3/1454* (2013.01); *G08G 5/0021* (2013.01); *G09G 5/12* (2013.01); *G09G 2354/00* (2013.01); *G09G 2380/12* (2013.01)

(58) Field of Classification Search
None
See application file for complete search history.

(56) References Cited

U.S. PATENT DOCUMENTS 10,235,890 B1 * 3/2019 McCusker ........... G08G 5/0052
2010/0302147 A1  12/2010 Lefort et al.
(Continued)

FOREIGN PATENT DOCUMENTS

| EP | 2645066 A1 | 10/2013 |
| EP | 3 208 707 A1 | 8/2017 |
| EP | 3 210 891 A1 | 8/2017 |

OTHER PUBLICATIONS

French Search Report, from the French Patent Office in counterpart French Application No. 1903771, dated Dec. 20, 2019.

*Primary Examiner* — Rinna Yi
(74) *Attorney, Agent, or Firm* — ArentFox Schiff LLP

(57) ABSTRACT

This interaction system comprising a display assembly associated with an avionic screen and including a video acquisition module configured to acquire a first graphic feed coming from an avionic system and a second graphic feed coming from an open-world equipment item, a media management module configured to control the display on the avionic screen and to generate windowing data relative to the positioning of different windows on the display screen and an interaction assembly able to generate interaction data. The system further comprises a connection box of the open-world equipment item and a control module of the open-world equipment item configured to process the windowing data and the interaction data in order to generate, from at least some of the interaction data, a command intended for the open-world equipment item.

13 Claims, 6 Drawing Sheets

(51) Int. Cl.
*G06F 3/14* (2006.01)
*G09G 5/12* (2006.01)

(56) References Cited

U.S. PATENT DOCUMENTS

| | | | |
|---|---|---|---|
| 2011/0219409 A1* | 9/2011 | Frisco | H04N 7/18 |
| | | | 725/77 |
| 2012/0023437 A1* | 1/2012 | Moriwaki | G06F 3/1423 |
| | | | 715/781 |
| 2017/0075558 A1 | 3/2017 | Shapiro et al. | |
| 2017/0242564 A1* | 8/2017 | De Bossoreille | G06F 3/1454 |
| 2019/0196686 A1* | 6/2019 | Stulken | G06F 3/1454 |

\* cited by examiner

INTERACTION SYSTEM FOR COCKPIT OF AN AIRCRAFT

CROSS-REFERENCE TO RELATED APPLICATIONS

This application claims priority to French Application No. 19 03771, filed on Apr. 9, 2019. The disclosure of the priority application is incorporated in its entirety herein by reference.

FIELD OF THE INVENTION

The present invention relates to an interaction system for the cockpit of an aircraft.

The invention relates to the field of aeronautics, and more particularly the field of man-machine interactions within the cockpit of an aircraft.

BACKGROUND OF THE INVENTION

In a manner known in itself, the mission of the crew of the aircraft requires a multitude of data coming from very different systems. This often involves the need to ensure effective and fast interactions between these different systems and between the crew and these systems. This type of interaction is known as "man-machine interaction".

Modern cockpits introduce advanced interaction capabilities with avionic systems by favoring tactile interactions.

The use of tactile interactions requires great reactivity by systems implementing these interactions, in particular for the new types of interactions that this medium entails, for example moving a graphic element with the finger ("drag"), or controlling a zoom level by "pinching" or "spreading".

The systems usable by the crew in the cockpit in particular include systems, said to be from the world of avionics, such as a flight management computer, and equipment items, said to be from the open world, such as an EFB (Electronic Flight Bag) tablet.

The development of open-world equipment items within the cockpit and the emergence of an increasingly developed connected network are making it possible to consider increasingly evolved applications in the open world that complete the functionalities of the certified cockpit.

The non-criticality of these applications allows rapid, regular and inexpensive evolution.

To facilitate the continuity of the operations between the applications from the world of avionics, displayed in the cockpit, and the applications from the open world, in particular displayed on the EFB tablet, it is interesting to be able to display the content of the applications from the open world by using the screens of the cockpit.

This also makes it possible to reduce the bulk of the cockpit by an additional screen that can also limit the outside visibility and require a complex installation to be put within reach of the pilot. Unlike such an additional screen, a tablet can be installed easily and even stored in a space provided to that end, which is called a "rack".

To best incorporate the applications from the open world and facilitate the mission, it is already possible to display content coming from an open-world equipment item, such as a tablet, into the avionic viewing screens by a video connection.

It is also possible to perform at least certain commands in relation with the avionic screen so as to control the open-world equipment item.

Thus, for example, the movements of the cursor performed via an appropriate pointing device can be used to control the open-world equipment item.

However, with this solution, it is only possible to send an open-world display oriented in landscape mode and displayed in full-screen on the avionic viewing unit. This solution also depends on the operating system used by the open-world equipment item and can be unsuitable for at least some of these systems.

Furthermore, this solution does not make it possible to display the content from the world of avionics for example in a manner juxtaposed or superimposed with a window whose contents come from the open world. Indeed, in this case, the decentralization of the management in particular of the cursor would not have made it possible to ensure a continuous transition between the various displayed windows.

Another identified solution to be able to interact in the cockpit with open-world equipment items is to couple these equipment items functionally with avionic applications in order to import data from the open world into the world of avionics.

The drawback of this solution is that it requires the implementation of substantial and expensive securing mechanisms (secure server) between the world of avionics and the open world in order in particular to avoid risks of malevolent intrusions into the avionic systems. This solution, which is not always compatible with deployment on a light aircraft for which reduced material costs are targeted, also introduces additional lags into data processing.

SUMMARY OF THE INVENTION

The present invention aims to propose an interaction system making it possible to address these issues. Thus, the interaction system according to the invention makes it possible to display, on a same avionic screen, information coming from different worlds while ensuring continuous interactions while going from one of these worlds to the other. The exchanges between the two worlds have a high level of security while avoiding additional lags in the processing of the data. Lastly, the system according to the invention allows an easy adaptation of any open-world equipment item to operation with the world of avionics, independently of the operating system used.

To that end, the invention relates to an interaction system for the cockpit of an aircraft, comprising:
- a display assembly associated with an avionic screen including:
  - a video acquisition module configured to acquire a first graphic feed coming from an avionic system and a second graphic feed coming from an open-world equipment item;
  - a media management module configured to control the display on the avionic screen in order to display, on this screen, the first graphic feed in a first window and the second graphic feed in a second window, the media management module further being configured to generate windowing data relative to the positioning of different windows on the display screen; and
  - an interaction assembly able to generate interaction data relative to each interaction of the user with the avionic screen;
- a connection box of the open-world equipment item:

a first conversion module configured to receive the windowing data coming from the media management module and the interaction data coming from the interaction assembly;

a second conversion module able to receive a graphic feed coming from the open-world equipment item and to send it to the video acquisition module to display it in the second window of the avionic screen;

a control module of the open-world equipment item configured to process the windowing data and the interaction data coming from the first conversion module in order to generate, from at least some of the interaction data, a command intended for the open-world equipment item.

According to other advantageous aspects of the invention, the system comprises one or more of the following features, considered alone or according to all technically possible combinations:

the interaction assembly comprises an acquisition module for tactile gestures configured to acquire each tactile interaction by the user with the avionic screen and to convert it into an interaction datum;

the media management module is connected to the first conversion module via the tactile gesture acquisition module;

the interaction assembly comprises a command acquisition module configured to acquire each interaction by the user exerted on a pointing device and/or a keyboard, the command acquisition module being connected directly to the media management module;

the video acquisition module is configured to exert at least one processing operation of the second graphic feed, each processing operation being chosen from the group comprising:
extracting a region of interest from this graphic feed;
rotating this graphic feed;
scaling this graphic feed as a function of the resolution of this feed and the resolution of the second window;
translating this graphic feed;

the control module is able to convert each interaction datum in the coordinate system of the open-world equipment item by using the corresponding windowing data;

the windowing data comprise:
origin of the second window in the coordinate system of the avionic screen;
dimensions of the second window;
cropping of the second feed;

the control module is integrated into the connection box;

the control module is integrated into the open-world equipment item;

the connection box is connected to the display assembly via at least two cables, one of the two cables connecting the first conversion module to the display assembly and advantageously being of type RS422, and the other cable connecting the second conversion module to the display assembly and advantageously being of type SMPTE;

the connection box is connected to the open-world equipment item via at least two cables, advantageously assembled to one another and coupled to the open-world equipment item via a single connector, or via a cable and a wireless connector, or via two wireless links;

the system comprises another display assembly similar to said display assembly and associated with another avionic screen;
the first conversion module of the connection box being able to receive the interaction data coming from the interaction assembly of a single display assembly at a time;
the second conversion module of the connection box being able to send the graphic feed coming from the open-world equipment item and to the video acquisition module of each display assembly in order to display it in the second window of the corresponding avionic screen;

at least one other connection box to another open-world equipment item similar to said connection box;

the media management module of at least one display assembly being configured to display, on the corresponding avionic screen, a graphic feed coming from this other open-world equipment item in a third window;

the system comprises a control server connected to said at least one display assembly and configured to send interaction data and windowing data to the open-world equipment item corresponding to these data;

the server comprises a video server able to send a graphic feed coming from each open-world equipment item to the corresponding display assembly;

the or each connection box is a host station of the corresponding open-world equipment item; and the open-world equipment item is a touch-sensitive tablet.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
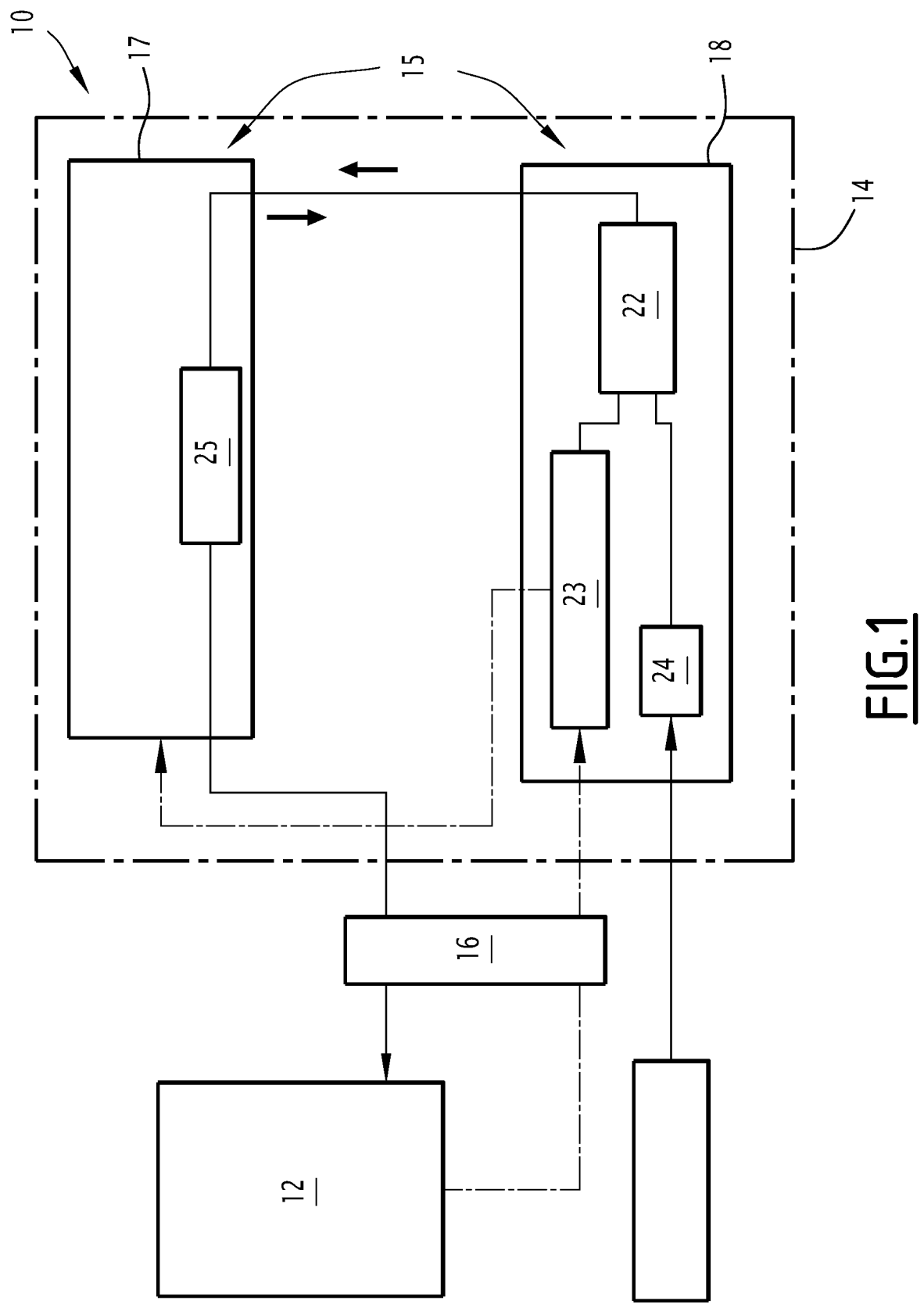
FIG. 1 is a schematic view of an interaction system according to a first embodiment of the invention, the system comprising a connection box.

FIG. 1 indeed illustrates an interaction system 10 of the cockpit of an aircraft.

"Aircraft" refers to any flying vehicle at least partially pilotable by at least one pilot. The piloting is done from a cockpit of this aircraft.

According to one exemplary embodiment, the aircraft is an airplane or a helicopter. In this case, the piloting is done from the cockpit arranged in this airplane or helicopter.

According to another exemplary embodiment, the aircraft is a drone able to be piloted remotely. In this case, "cockpit" refers to the remote command center from which the piloting is done.

The interaction system 10 in particular makes it possible to connect an open-world equipment item to an avionic screen in order to at least partially control the running of this open-world equipment item using the avionic screen.

"Open-world equipment item" refers to any noncertified equipment item or equipment item having a certification level lower than that of an avionic system that is usable by the pilot to prepare a flight and/or ensure its proper progression.

Thus, such an open-world equipment item has a computer (in particular a laptop computer), a telephone (in particular a smartphone) or a tablet (in particular a touch-sensitive tablet).

According to the invention, the open-world equipment item in particular makes it possible to send a graphic feed in order to display it on an avionic screen, as will be described hereinafter.

"Graphic feed" refers to a plurality of images produced by a graphic map of the open-world equipment item and intended to be displayed on a screen. These images are devoid of functional data, that is to say, digital data able to interact with other digital data.

In the example described below, the open-world equipment item is a touch-sensitive tablet 12 of the EFB type previously explained. However, any teaching described hereinafter in relation with such an avionic tablet remains applicable to an open-world equipment item broadly speaking.

In reference to FIG. 1, the interaction system 10 comprises a display assembly 14 associated with an avionic screen 15 and a connection box 16.

The avionic screen 15 corresponds to one of the screens present in the cockpit of the aircraft. Thus, for example, the avionic screen 15 is a central screen or a side screen.

Furthermore, as is known in itself, the avionic screen 15 has a front part 17 defining a display surface and a touch-sensitive slab associated with the display surface, and a rear part 18 defining different components implementing the running of the display surface.

The display assembly 14 makes it possible to steer the running of the avionic screen 15 and to that end comprises a media management module 22, a video acquisition module 23 and a command acquisition module 24 that are integrated into the rear part 18 and a tactile gesture acquisition module 25 that is integrated into the front part of the avionic screen 15.

These various modules 22 to 25 for example at least partially assume the form of software applications executable by one or several suitable processors. In a variant or in addition, at least some of these modules at least partially assume the form of programmable logic circuits of the FPGA type (Field-Programmable Gate Array).

The tactile gesture acquisition module 25 is associated with the touch-sensitive slab of the avionic screen 15 and able to acquire each tactile interaction by the user with the display surface and to convert it into an interaction datum.

This acquisition module 25 is also called "TAM module", which stands for "Touch Acquisition Module".

The command acquisition module 24 is associated with a pointing device, for example of the CCD (Cursor Control Device) type and/or a physical keyboard, for example of the KBD (KeyBoard Device) type.

Thus, this module 24 makes it possible to acquire commands coming from each of these devices and to convert them into corresponding interaction data.

The command acquisition module 24 and the tactile gesture acquisition module 25 then generate interaction data relative to the avionic screen 15. These modules 24, 25 thus form the above-mentioned interaction system, which allows the pilot to interact with the avionic screen 15 and thus to control the running of one or several avionic systems as well as the avionic tablet 12, as will be explained hereinafter.

The video acquisition module 23 makes it possible to acquire a graphic feed coming from one or several avionic systems and a graphic feed coming from the tablet 12 in order to display these feeds at the same time on the avionic screen 15.

In particular, the video acquisition module 23 makes it possible to display, on the avionic surface, a first window juxtaposed or superimposed with at least one second window.

The first window, called avionic world window, is dedicated to the world of avionics and therefore makes it possible to display the graphic feed coming from one or several avionic systems.

The second window, called open world window, is dedicated to the open world and therefore makes it possible to display a graphic feed in particular coming from the tablet 12.

The video acquisition module 23 further makes it possible to perform at least one processing operation of the graphic feed coming from the tablet 12.

Each processing operation is chosen from the group comprising:
extracting a region of interest from the received graphic feed;
rotating the received graphic feed;
scaling the received graphic feed as a function of the resolution of this feed and the resolution of the second window;
translating the received graphic feed.

In particular, the extraction of a region of interest in particular makes it possible to zoom in on part of the graphic feed.

Rotating the graphic feed in particular makes it possible to adapt the portrait or landscape presentation of the tablet 12.

Scaling in particular makes it possible to adapt the resolution of the image supplied by the tablet to the window in which it is displayed.

The translation in particular makes it possible to position the video image in the desired position on the avionic screen 15.

According to one exemplary embodiment, the video acquisition module 23 comprises two components called VAM (Video Acquisition Module) and GGM (Graphic Generation Module). The first of these components makes it possible to acquire the graphic feed coming from the tablet 12 and the second makes it possible to perform at least one processing operation of this feed.

The media management module 22 is connected to the command acquisition module 24 and to the tactile gesture acquisition module 25 and makes it possible to process interaction data from these modules 24, 25.

As a function of the processed interaction data, the media management module 22 makes it possible to control the running of the video acquisition module 23.

In particular, it makes it possible to command the execution of a processing operation and the change of the position and/or size of the open-world or avionic-world window, following a corresponding command from the pilot given for example by a tactile gesture.

The media management module 22 further makes it possible to generate windowing data relative to the positioning of different windows on the display screen and in particular of the open-world window, and to send these data to the tactile gesture acquisition module 25.

Lastly, the media management module 22 also makes it possible to inhibit or reduce the open-world window if one or several avionic-world windows are open superimposed with this open-world window. This then corresponds to a principle of preempting interactions relative to the avionic world.

The windowing data comprise at least one of the elements chosen from the group comprising:
- origin of the open-world window in the coordinate system of the avionic screen of the display assembly;
- dimensions of the open-world window;
- cropping of the graphic feed coming from the open-world equipment item when this feed is cropped in the open-world window.

The media management module 22 further makes it possible to send the tactile gesture acquisition module interaction data generated by the command acquisition modules 24.

The connection box 16 makes it possible to connect the tablet 12 to the avionic screen 15.

According to one specific exemplary embodiment of the invention, the connection box 16 assumes the form of a host station for the tablet 12 and therefore defines a housing with appropriate connector technology so as to receive the tablet and send and receive data to or from said tablet.

Figure 2:
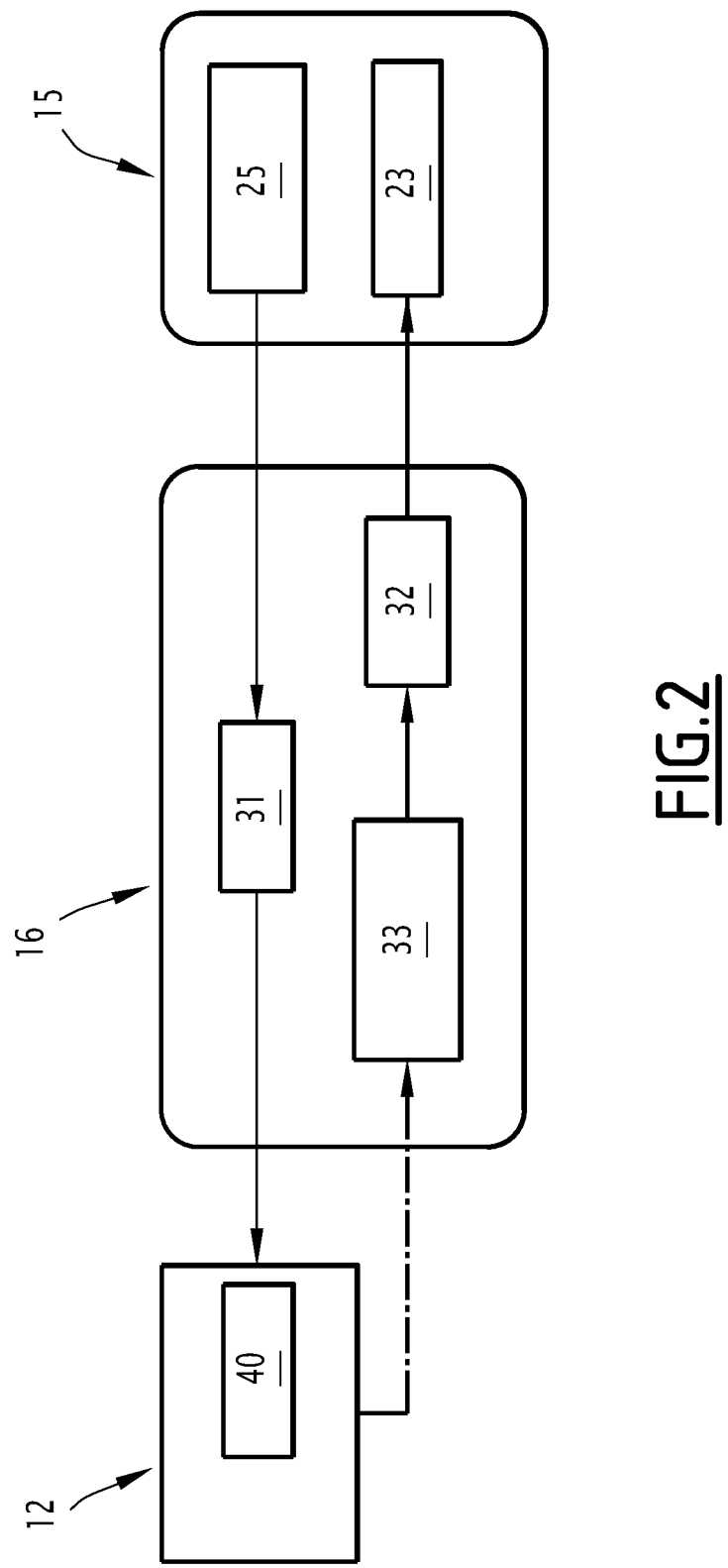
FIGS. 2 and 3 are schematic views of the connection box of FIG. 1 respectively according to first and second exemplary embodiments of this box.

The internal structure of the connection box according to a first exemplary embodiment is illustrated in FIG. 2.

In particular, as shown in this FIG. 2, the connection box 16 comprises a first conversion module 31, a second conversion module 32 and an adapter module 33.

Like in the previous case, these modules 31 to 33 at least partially assume the form of software and/or programmable logic circuits of the FPGA type.

The first conversion module 31 is connected to the front part 17 of the avionic screen 15 and in particular the tactile gesture acquisition module 25 by a one-way link going from the tactile gesture acquisition module 25 for example via a cable, for example of the RS422 type.

Thus, the first conversion module 31 is suitable for receiving interaction data generated by the tactile gesture acquisition module 25 and/or sent to the latter by the media management module 22 as well as the windowing data sent to this module 25 by the media management module 22.

The module 31 further makes it possible to convert the acquired data into a form usable by the tablet 12.

The first conversion module 31 is connected to a command module 40 of the tablet 12, which, according to the exemplary embodiment of FIG. 2, is integrated into the tablet 12. This connection is done via a one-way link going from the first conversion module, for example via a cable, for example of the USB type.

The control module 40 is also part of the interaction system 10 according to the invention and for example assumes the form of software, in particular a driver, integrated into the tablet 12 and able to emulate interaction peripherals (touchpad, mouse, keyboard) at the operating system level of the tablet 12.

This module 40 in particular makes it possible to analyze the windowing data and the interaction data acquired by the first conversion module 31.

In particular, among the interaction data, the command module 40 makes it possible to extract interaction data relative to the open-world window, by using the windowing data. Then, the command module 40 makes it possible to associate corresponding commands with the extracted interaction data, assuming that these data have been generated directly by the interaction peripherals of the tablet 12.

The adapter module 33 is connected to the tablet 12 via a one-way link going from the tablet 12 and formed for example by a cable of the USB type. This link makes it possible to acquire a graphic feed coming from the tablet 12. In the case where the conversion module 31 is connected to the tablet 12 also via a cable, it is possible to provide a single assembled two-way cable, for example of the USB type, connecting the tablet 12 to the connection box 16 via a single connector.

The adapter module 33 also makes it possible to send this graphic feed to the second conversion module 32 by performing prior processing of this feed for example consisting of modifying its dimensions in particular by resampling and/or by changing its width/height ratio by adding black bars. The second conversion module 32 is connected to the back part 18 of the avionic screen 15 and in particular the video acquisition module 23 previously explained. This connection also has a one-way link and is for example done by a cable for example of the SMPTE or ARINC 818 or HDMI type.

The second conversion module 32 makes it possible to convert the graphic feed acquired by the module 33 into a form usable by the video acquisition module 23.

Figure 3:
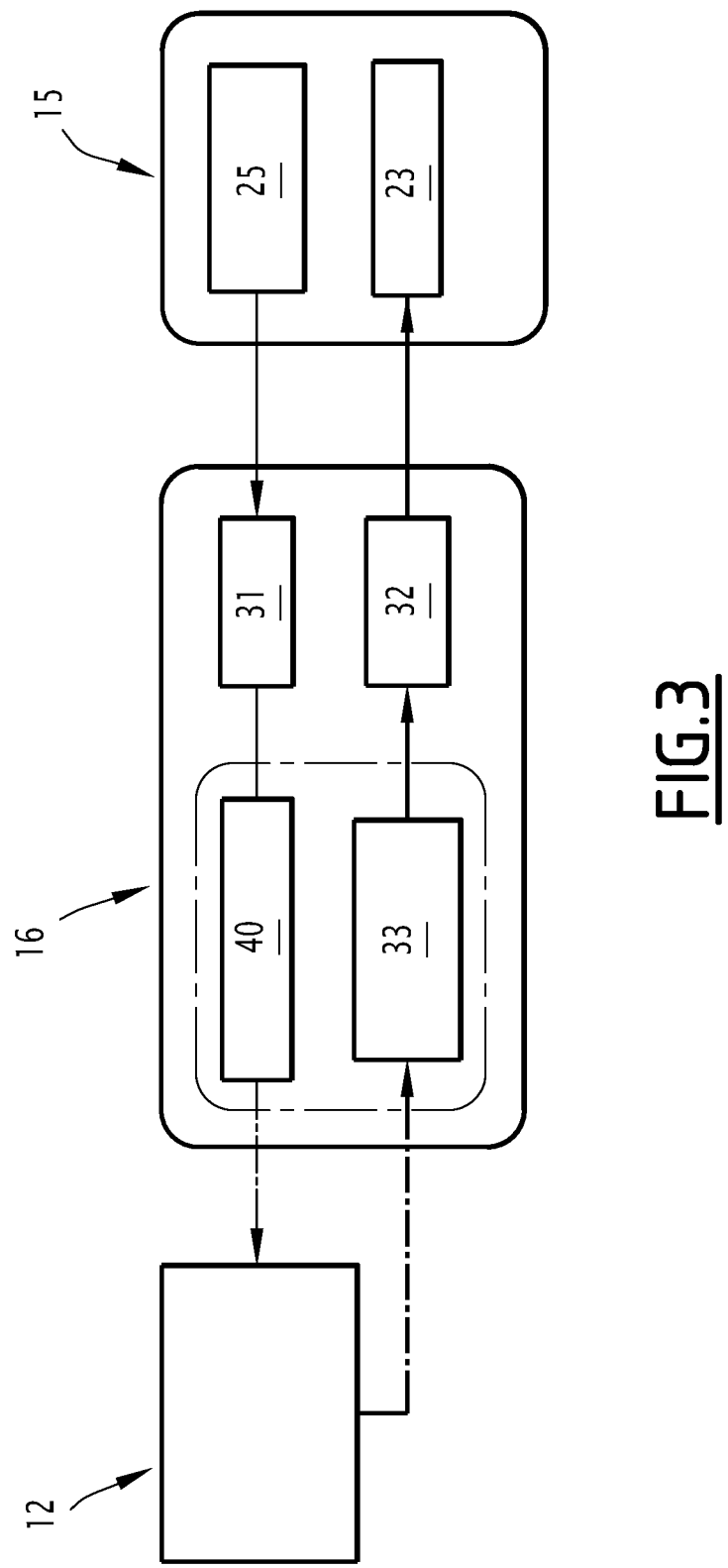

The connection box 16 according to a second exemplary embodiment is illustrated in FIG. 3.

Like in the previous case, this box comprises the first conversion module 31, the second conversion module 32 and the adapter module 33 previously described.

Unlike the first exemplary embodiment, the connection box 16 further comprises the command module 40 as previously explained.

In this case, the command module 40 is connected to the tablet via a cable for example of the USB type, or then via a wireless connection such as Bluetooth® or Wi-Fi.

Thus, the tablet 12 sees the command module 40 as an outside peripheral such as a keyboard, for example.

Furthermore, in both exemplary embodiments, the adapter module 33 can also be coupled to the tablet 12 via a wireless connection such as Wi-Fi.

According to still another exemplary embodiment (not illustrated), the command module 40 assumes the form of two separate components, one being integrated into the tablet 12 and the other into the box 16. In this case, these components perform separate functions.

The operation of the interaction system 10 according to the invention will now be explained.

It is initially assumed that the video acquisition module 23 displays, on the avionic screen 15, a graphic feed coming from the tablet 12 in the open-world window juxtaposed with the avionic-world window.

This display is managed by the media management module 22, which also generates display data relative to the positioning of these different windows on the display screen 15.

When the pilot performs an action relative to the pointing device or the keyboard, the display management module receives corresponding interaction data from the acquisition module 24 and sends them to the tactile gesture acquisition module 25.

When the pilot performs a tactile gesture related to the display surface, the tactile gesture acquisition module 25 in turn generates corresponding interaction data.

Then, in both cases, the tactile gesture acquisition module 25 sends the interaction data to the command module 40 of the tablet 12 through the first conversion module 31.

The command module 40 then analyzes these data, and when the interaction data correspond to the open-world window, performs the corresponding command.

This command then modifies the graphic feed generated by the tablet, which is next sent to the video acquisition module 23 in particular through the second conversion module 32, to be displayed on the avionic screen.

When the action performed by the pilot relates to cropping of the open-world window, the media management module 22 therefore converts the interaction data generated by the pointing device, the keyboard or the tactile gesture acquisition module 25 into a corresponding command that is sent to the video acquisition module 23.

This module 23 then carries out this command by performing a corresponding processing operation. New windowing data are ultimately generated by the media management module 22 and are sent to the tablet through the tactile gesture acquisition module 25 and the first conversion module 31.

One can then see that the invention has a certain number of advantages.

First of all, the invention makes it possible to display and interact from the avionic screen with an application hosted on an open-world equipment item, such as a tablet, for example.

To that end, a window dedicated to the open world is displayed on the avionic screen in a manner juxtaposed or superimposed with a window dedicated to the avionic world.

The sizes, position and orientation of this open-world window can be changed by the pilot. Additionally, in case of superposition, the interactions with the open-world window can be preempted.

Furthermore, the centralized management of the interaction data makes it possible to fluidify the transitions in particular of the cursor between an open-world window and an avionic-world window.

Additionally, the invention offers an optimal solution in terms of interaction lags, because the tactile gesture acquisition module is connected directly to the first conversion module.

Furthermore, the invention requires a simple connection, since all of the exchanges are done through one-way connections. The simplicity of such a connection also contributes to obtaining reduced interaction lags.

Furthermore, only the data corresponding to graphic feeds are sent to the avionic world. Thus, it is not necessary to use a secure server when sending these data.

Lastly, any avionic-world equipment item can easily be adapted to interact with the connection box.

Figure 4:
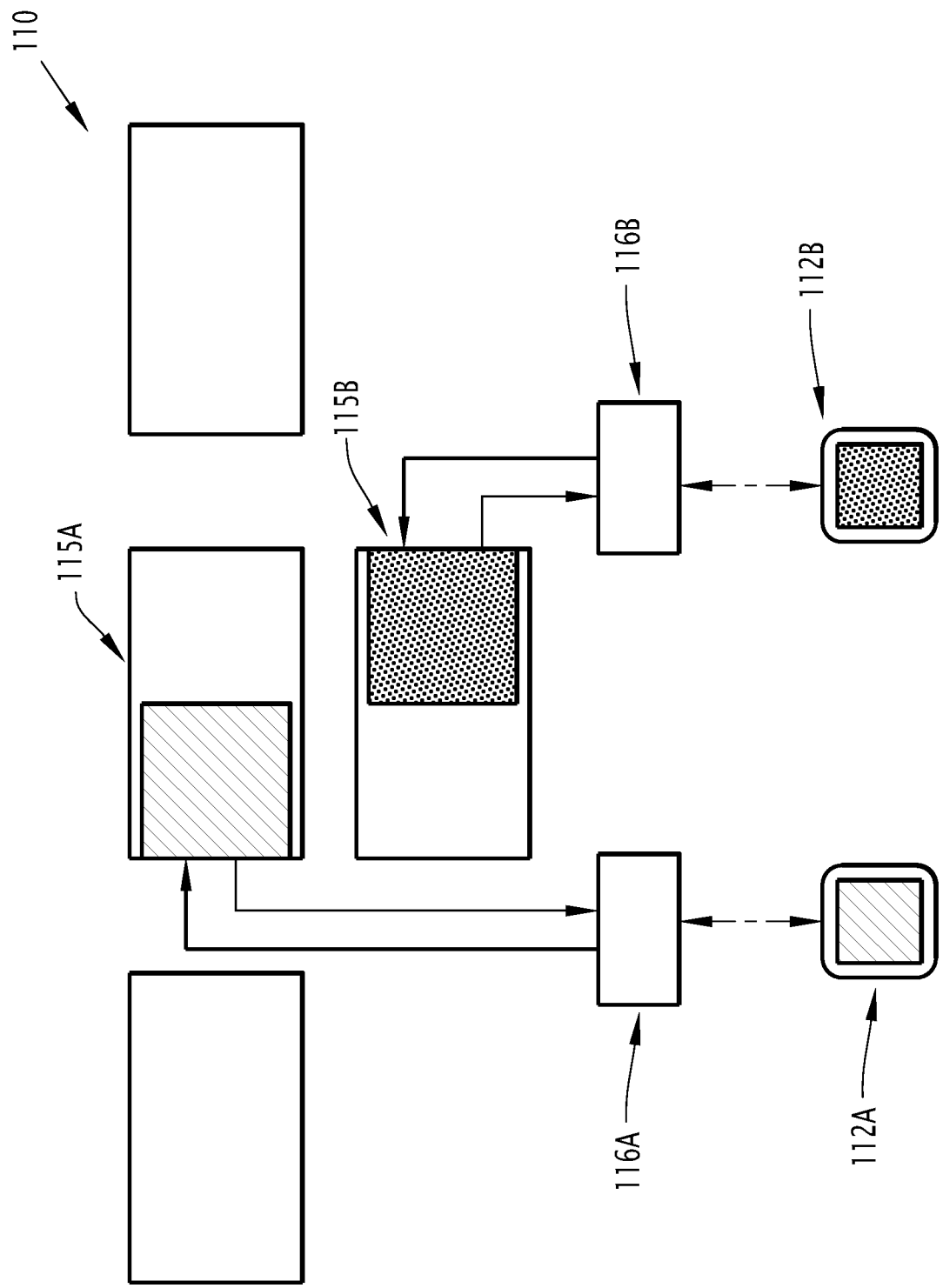
FIGS. 4 to 6 are schematic views respectively illustrating a second, third and fourth embodiment of the interaction system according to the invention.

An interaction system 110 according to a second embodiment is illustrated in FIG. 4.

Unlike the interaction system 10 previously described, the interaction system 110 comprises two display assemblies (not visible in FIG. 4) that are associated with two different avionic screens 115A, 115B and two connection boxes 116A, 116B that are associated with two different open-world equipment items 112A, 112B.

Each display assembly is similar to the display assembly 14 previously described and each connection box 116A, 116B is similar to the connection box 16 previously described.

Thus, in the example of FIG. 4, the box 116A makes it possible to connect the open-world equipment item 112A to the avionic screen 115A and the box 116B makes it possible to connect the open-world equipment item 112B to the avionic screen 115B.

The interaction system 110 according to the second embodiment thus makes it possible to use two open-world equipment items in the cockpit, for example by two pilots at the same time, by using two different avionic screens.

Figure 5:
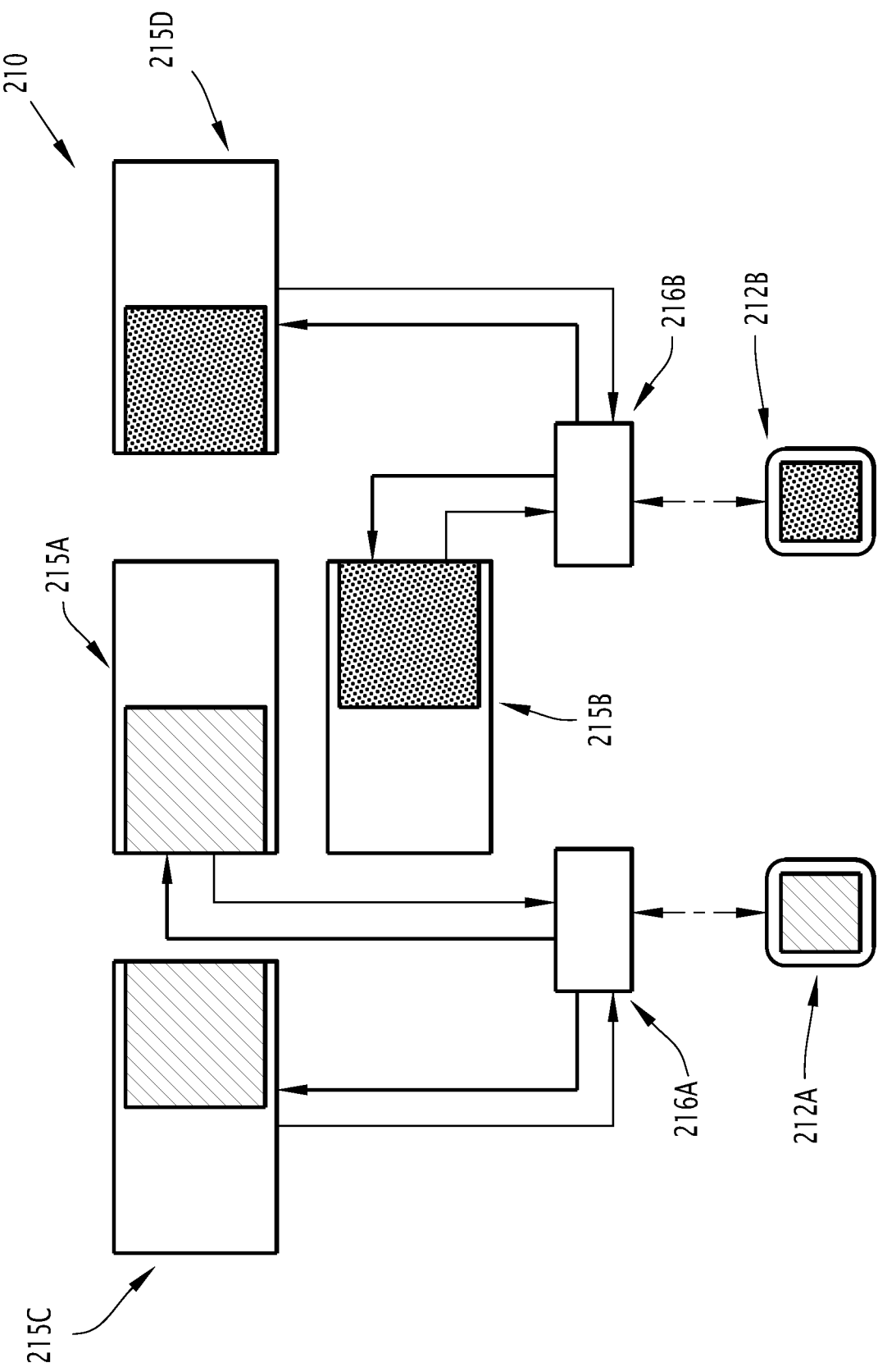

An interaction system 210 according to a third embodiment of the invention is illustrated in FIG. 5.

Like in the case of the interaction system 100, the interaction system 200 comprises two connection boxes 216A, 216B associated with two different open-world equipment items 212A, 212B.

Unlike in the previous case, each connection box 216A, 216B makes it possible to connect the open-world equipment item to two different avionic screens.

Thus, in the example of FIG. 5, the connection box 216A makes it possible to connect the open-world equipment item 212A to the avionic screens 215A and 215C and the connection box 216B makes it possible to connect the open-world equipment item 212B to the avionic screens 215B and 215D.

In this case, for each avionic screen, the interaction system 210 further comprises a display assembly (not shown in FIG. 5) similar to the display assembly 14 previously described.

Each connection box 216A, 216B differs from the connection box 16 previously described solely in that the second conversation [sic] module of each connection box 216A, 216B is connected to the two different display assemblies and configured to send a graphic feed to each of these display assemblies.

Furthermore, the second conversation [sic] module of each connection box 216A, 216B is connected to the two different display assemblies and configured to send a graphic feed to each of these display assemblies.

Moreover, the first conversion module of each connection box 216A, 216B is suitable for receiving interaction data and windowing data coming from each display assembly with which it is connected.

However, in this case, the first conversion module of each connection box 216A, 216B comprises a switch making it possible to receive at least interaction data from a single display assembly.

To that end, such a switch for example assumes the form of software or a programmable logic circuit making it possible to process interaction data coming from a single input, that is to say, a single display assembly.

This switch is for example able to be switched manually by the pilot via a corresponding interface.

Furthermore, in case of malfunction of such a switch, the corresponding first conversion module is configured to ignore any received interaction data.

The interaction system 210 according to the third embodiment thus makes it possible to associate an open-world equipment item with several avionic screens.

Figure 6:
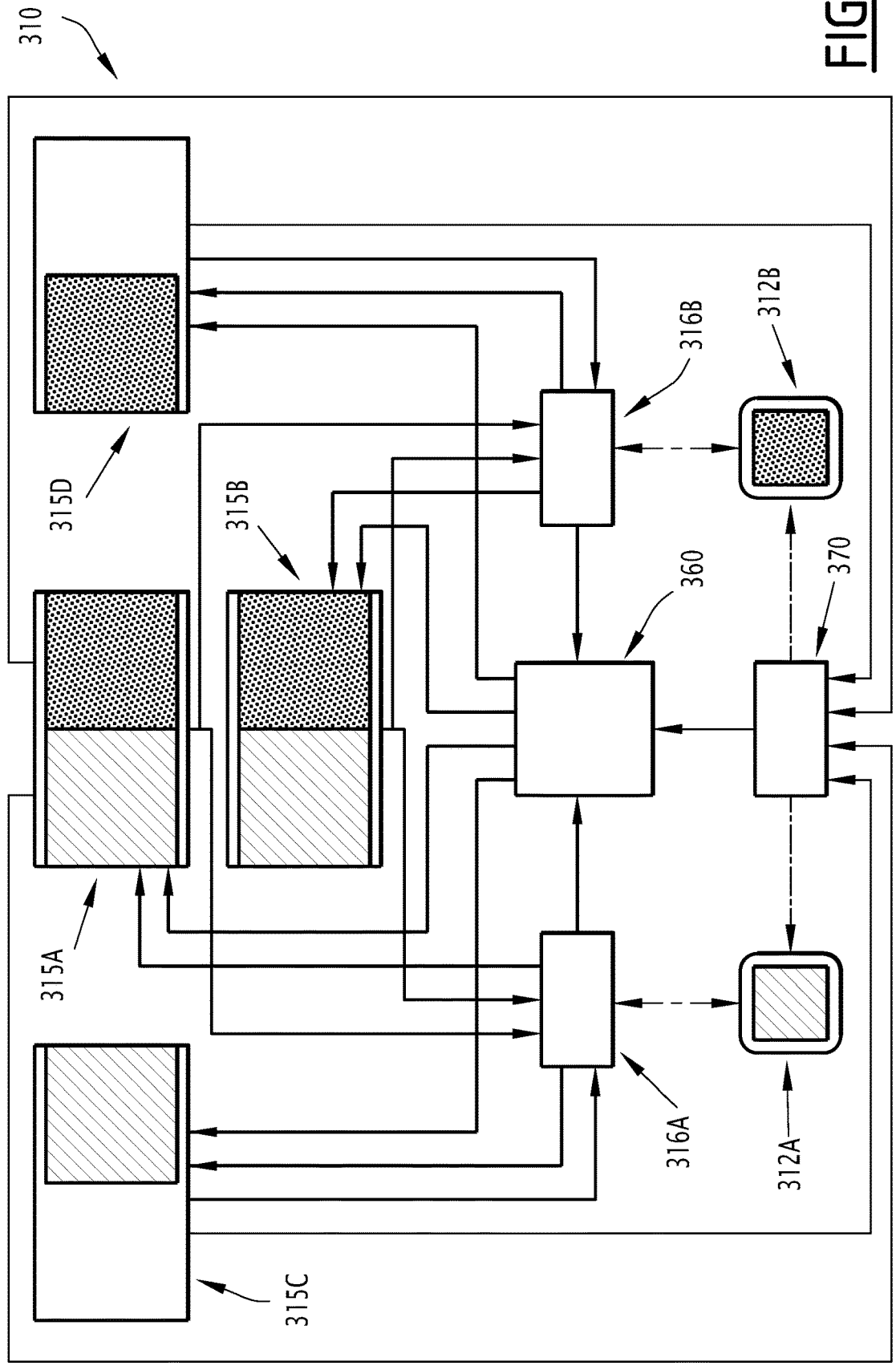

An interaction system 310 according to the fourth embodiment is illustrated in detail in FIG. 6.

Thus, as visible in this FIG. 6, the interaction system 310 comprises two connection boxes 316A, 316B similar to the connection boxes 216A, 216B and a display assembly (not illustrated) for each avionic screen used. In particular, each connection box 316A, 316B makes it possible to connect an open-world equipment item 312A, 312B to several avionic screens.

In the exemplary embodiment of FIG. 6, each connection box 316A, 316B makes it possible to connect the corresponding open-world equipment item to all of the avionic screens 315A to 315D.

To that end, according to this embodiment, the interaction system 310 further comprises a video server 360 and a control server 370.

In particular, the video server 360 makes it possible to send a graphic feed coming from one of the connection boxes 316A, 316B to several avionic screens 315A to 315D, for example via a cable of the SMPTE type.

The video acquisition module of each display assembly is thus suitable for receiving a graphic feed not only from one of the connection boxes 316A, 316B, but also the graphic server 360.

The video acquisition module of each display assembly is also adapted to display graphic feeds coming from different open-world equipment items 312A, 312B in different open-world windows on a same display surface.

The control server 370 makes it possible to send interaction data as well as windowing data to the open-world equipment items 312A, 312B for which these data are intended.

To that end, the control server 370 is connected on the one hand to each display assembly, for example via a connection of the Ethernet type, and on the other hand to each open-world equipment item 312A, 312B, for example via a wireless link for example of the Wi-Fi type, or then via a wired link of the USB or Ethernet type.

According to one exemplary embodiment, the control server 370 is connected to each open-world equipment item 312A, 312B through the corresponding connection box 316A, 316B so as to be able to address the solution described by FIG. 3 (exploitation of windowing data done in this connection box), or to centralize the exchange feed in the case of the solution of FIG. 2. In this last case, it is possible to provide a single connector, for example of the USB type, managing all of the feeds.

In the example of FIG. 6, the connection box 316A connects the open-world equipment item 312A directly to the avionic screens 315A and 315C and via the video server 360 to the screens 315B and 315D.

Thus, the exchanges of graphic feeds and interaction and windowing data between the open-world equipment item 312A and the display assemblies associated with the avionic screens 315A, 315C are done as previously explained in relation with FIG. 5.

Conversely, the transmission of the graphic feeds from the open-world equipment item 312A to the display assemblies associated with the avionic screens 315B, 315D is done via the connection box 316A, and then via the video server 360.

The transmission of interaction and windowing data coming from the display assemblies associated with the avionic screens 315B, 315D to the open-world equipment item 312A is done via the control server 370.

Similarly, according to the same example, the connection box 316B connects the open-world equipment item 312B directly to the avionic screens 315B and 315D and via the video server 360 to the screens 315A and 315C.

Thus, the exchanges of graphic feeds and interaction and windowing data between the open-world equipment item 312B and the display assemblies associated with the avionic screens 315B, 315D are done as previously explained in relation with FIG. 5.

The exchanges of graphic feeds and interaction and windowing data between the open-world equipment item 312B and the display assemblies associated with the avionic screens 315A, 315C are done via the video server 360 through the connection box 316B or via the control server 370.

One can then see that the interaction system 310 according to the fourth embodiment makes it possible not only to connect each open-world equipment item to all of the avionic screens, but also to display, on a same avionic screen, graphic feeds coming from different avionic equipment items and therefore to control different open-world equipment items via a same avionic screen.

Of course, other examples of connections between open-world equipment items and avionic screens of the cockpit are possible.

One can easily see that at least in some embodiments, the tactile gesture acquisition module is connected to the control module of the open-world equipment item directly, passing only through the first conversion module of the box. This makes it possible to minimize the lag and to preserve the refresh frequency of the data coming from the tactile gesture acquisition module.

Furthermore, the connection of the media management module to the first conversion module via the tactile gesture acquisition module makes it possible to compute less critical display configuration data in terms of lag (such as the position) via the avionic module, and in particular the display assembly. These data are next sent to the control module of the open-world equipment item with the data coming from the tactile gesture acquisition module, through direct connections.

Lastly, it is clear that the invention makes it possible to implement a single, secure physical connection between the avionic world and the open world in order to send all of the interaction data.

The invention claimed is:

1. An interaction system for a cockpit of an aircraft, comprising a processor configured to function as:
    a display assembly associated with an avionic screen and including:
    a video acquisition module configured to acquire a first graphic feed coming from an avionic system and a second graphic feed coming from an open-world equipment item in order to display the first graphic feed and the second graphic feed at a same time on the avionic screen;
    a media management module configured to control the display on the avionic screen in order to display, on this screen, the first graphic feed in a first window and the second graphic feed in a second window, the media management module further being configured to generate windowing data relative to a positioning of different windows on the display screen; and
    an interaction assembly able to generate interaction data relative to each interaction of a user with the avionic screen;
    a connection box for the open-world equipment item comprising:
    a first conversion module configured to receive the windowing data coming from the media management module and the interaction data coming from the interaction assembly;
    a second conversion module able to receive the second graphic feed coming from the open-world equipment item and to send it to the video acquisition module to display it in the second window of the avionic screen;
    a control module of the open-world equipment item configured to process the windowing data and the interaction data coming from the first conversion module in order to generate, from at least some of the interaction data, a command intended for the open-world equipment item;

wherein the interaction assembly comprises a tactile gesture acquisition module configured to acquire each tactile interaction by the user with the avionic screen and to convert it into an interaction datum;
wherein the media management module is connected to the first conversion module via the tactile gesture acquisition module, and the media management module is further configured to send the windowing data to the tactile gesture acquisition module;
wherein the tactile gesture acquisition module and the first conversion module are connected via only one first one-way link, and the first one-way link starting at the tactile gesture acquisition module and terminating at the first conversion module;
wherein the first conversion module is further connected to the control module of the open-world equipment item via only one second one-way link, and the second one-way link starting at the first conversion module and terminating at the control module of the open-world equipment item; and
wherein the windowing data comprises data relative to the second window, and the data comprises origin of the second window in a coordinate system of the avionic screen, dimensions of the second window, and cropping of the second graphic feed coming from the open-world equipment item when this feed is cropped in the open-world window.

2. The interaction system according to claim 1, wherein the tactile gesture acquisition module is connected to the control module of the open-world equipment item via the first conversion module.

3. The interaction system according to claim 1, wherein the interaction assembly comprises a command acquisition module configured to acquire each interaction by the user exerted on a pointing device and/or a keyboard, the command acquisition module being connected directly to the media management module.

4. The interaction system according to claim 1, wherein the video acquisition module is configured to exert at least one processing operation of the second graphic feed, each processing operation being chosen from a group comprising:
extracting a region of interest from this graphic feed;
rotating this graphic feed;
scaling this graphic feed as a function of a resolution of this feed and the resolution of the second window;
translating this graphic feed.

5. The interaction system according to claim 1, wherein the control module is able to convert each interaction datum in a coordinate system of the open-world equipment item by using a corresponding windowing data.

6. The interaction system according to claim 1, wherein the command module is integrated into the connection.

7. The interaction system according to claim 1, wherein the command module is integrated into the open-world equipment item.

8. The interaction system according to claim 1, wherein:
the connection box is connected to the display assembly via at least two cables, one of the two cables connecting the first conversion module to the display assembly, and the other cable connecting the second conversion module to the display assembly;
the connection box is connected to the open-world equipment item via at least two cables, or via a cable and a wireless connector, or via two wireless links.

9. The interaction system according to claim 1, wherein the system comprises another display assembly similar to said display assembly and associated with another avionic screen;
the first conversion module of the connection box being able to receive the interaction data coming from the interaction assembly of a single display assembly at a time;
the second conversion module of the connection box being able to send the second graphic feed coming from the open-world equipment item and to the video acquisition module of each display assembly in order to display it in the second window of a corresponding avionic screen.

10. The interaction system according to claim 1, wherein at least one other connection box to another open-world equipment item similar to said connection box;
the media management module of at least one display assembly being configured to display, on a corresponding avionic screen, a graphic feed coming from this other open-world equipment item in a third window.

11. The interaction system according to claim 10, further comprising a control server connected to said at least one display assembly and configured to send interaction data and windowing data to the open-world equipment item corresponding to these data.

12. The interaction system according to claim 10, further comprising a video server able to send a graphic feed coming from each open-world equipment item to the corresponding display assembly.

13. The interaction system according to claim 1, wherein:
each connection box is a host station of a corresponding open-world equipment item; and
the open-world equipment item is a touch-sensitive tablet.

* * * * *